US012434273B2

(12) United States Patent
Nakazaki et al.

(10) Patent No.: US 12,434,273 B2
(45) Date of Patent: Oct. 7, 2025

(54) CLEANING APPARATUS AND ROTARY TABLE

(71) Applicant: SUGINO MACHINE LIMITED, Namerikawa (JP)

(72) Inventors: Kodai Nakazaki, Namerikawa (JP); Hiroki Haremaki, Namerikawa (JP)

(73) Assignee: SUGINO MACHINE LIMITED, Namerikawa (JP)

( * ) Notice: Subject to any disclaimer, the term of this patent is extended or adjusted under 35 U.S.C. 154(b) by 347 days.

(21) Appl. No.: 18/159,361

(22) Filed: Jan. 25, 2023

(65) Prior Publication Data

US 2023/0249226 A1 Aug. 10, 2023

(30) Foreign Application Priority Data

Feb. 8, 2022 (JP) ................................ 2022-017982

(51) Int. Cl.

*B08B 3/02* (2006.01)
*B08B 5/02* (2006.01)
*B08B 13/00* (2006.01)

(52) U.S. Cl.

CPC .............. *B08B 3/022* (2013.01); *B08B 3/024* (2013.01); *B08B 13/00* (2013.01); *B08B 3/02* (2013.01); *B08B 5/02* (2013.01); *B08B 2203/02* (2013.01)

(58) Field of Classification Search

CPC ......... B08B 3/022; B08B 3/024; B08B 13/00; B08B 2203/02; B08B 3/02; B08B 5/02

See application file for complete search history.

(56) References Cited

U.S. PATENT DOCUMENTS

2020/0108424 A1* 4/2020 Kunitomo ................ B08B 3/10

FOREIGN PATENT DOCUMENTS

JP 6081814 B2 * 2/2017
JP 2019093316 A * 6/2019
JP 2019-171270 A 10/2019
JP 6830170 B1 * 2/2021 ............... B05B 1/14

(Continued)

OTHER PUBLICATIONS

JP2019093316 translation (Year: 2019).*

(Continued)

*Primary Examiner* — Michael E Barr
*Assistant Examiner* — Lauren G Orta
(74) *Attorney, Agent, or Firm* — United IP Counselors, LLC

(57) ABSTRACT

Provided is a cleaning apparatus that cleans a cleaning target portion of a workpiece by a downward nozzle or a lance. The cleaning apparatus includes: a support table rotatable about a first axis that extends horizontally and having a first through hole that passes through the support table in a direction of a second axis perpendicular to the first axis; a cleaning table on which the workpiece is to be installed and rotatable about the second axis, the cleaning table having a second through hole that passes through the cleaning table in a direction of the second axis to expose substantially entire surface of an installation surface of the workpiece; a nozzle base movable in a lateral direction, a front-rear direction, and a vertical direction relative to the support table; and a nozzle disposed on the nozzle base in a rotatable manner about a nozzle rotational axis extending in the vertical direction.

20 Claims, 10 Drawing Sheets

(56) References Cited

FOREIGN PATENT DOCUMENTS

| | | | |
|---|---|---|---|
| JP | 6860520 | B2 | 4/2021 |
| WO | 2020/196567 | A1 | 10/2020 |

OTHER PUBLICATIONS

JP6081814 (JP2014159020) translation (Year: 2017).*
JP6830170 (JP2021133282) translation (Year: 2021).*
Office Action mailed on May 28, 2024 in a corresponding Japanese Patent Application No. 2022-017982 (3 pages).

* cited by examiner

CLEANING APPARATUS AND ROTARY TABLE

CROSS-REFERENCE TO RELATED APPLICATIONS

This application claims the benefit of priority to Japanese Patent Application No. 2022-0178982, filed on Feb. 8, 2022, the entire contents of which are hereby incorporated by reference.

BACKGROUND

1. Technical Field

The present invention relates to a cleaning apparatus and a rotary table.

2. Description of the Background

A conventional cleaning apparatus includes a cover, a moving device, a turret including a plurality of nozzles mounted thereon and disposed on the moving device, a rotary table, and a table installed on the rotary table and having a workpiece placed thereon (Japanese Patent No. 6830170; hereinafter, Patent Literature 1).

Further, a downward nozzle, an L-shaped nozzle, and a lance, which are mounted on a cleaning apparatus having a turret, are known (for example, Japanese Patent No. 6860520; hereinafter, Patent Literature 2).

BRIEF SUMMARY

An L-shaped nozzle is required for cleaning the right and left side surfaces of the workpiece by the cleaning apparatus disclosed in Patent Literature 1. The L-shaped nozzle disclosed in Patent Literature 2 may be difficult to clean depending on the backlash in a rotation direction or a shape of j et from the nozzle.

An object of the present invention is to provide a cleaning apparatus and a rotary table capable of cleaning a target cleaning portion on any surface of the workpiece by a downward nozzle or a lance.

A first aspect of the present invention provides a cleaning apparatus, including:

a support table configured to rotate about a first axis that extends horizontally, the support table having a first surface on which a workpiece is to be installed and a second surface opposed to the first surface, the support table having a first through hole that passes through the support table in a direction of a second axis that is perpendicular to the first axis;

a cleaning table on which the workpiece is to be installed, the cleaning table rotatable about the second axis, the cleaning table having a second through hole that passes through the cleaning table in a direction of the second axis to expose substantially entire surface of an installation surface of the workpiece;

a nozzle base configured to move in a lateral direction, a front-rear direction, and a vertical direction relative to the support table; and a nozzle disposed on the nozzle base in a rotatable manner about a nozzle rotational axis extending in the vertical direction.

A second aspect of the present invention provides a rotary table, including:

a support table configured to rotate about a first axis that extends horizontally, the support table having a first through hole that passes through the support table in a direction of a second axis that is perpendicular to the first axis;

a cleaning table on which a workpiece is to be installed, the cleaning table rotatable about the second axis, the cleaning table having a second through hole that passes through the cleaning table in a direction of the second axis to expose substantially entire surface of an installation surface of the workpiece;

a working fluid source;

a first coupler disposed on the support table to be connected to the working fluid source, the first coupler configured to advance or retract between a connection position and a retraction position, the first coupler being close to the second axis at the connection position, and the first coupler being away from the second axis at the retraction position;

a second coupler disposed on the cleaning table to be rotatable integrally with the cleaning table; and a clamp connected to the second coupler;

wherein when the cleaning table is at a connection phase, the first coupler moves to the connection position to be connected to the second coupler for connecting the clamp to the working fluid source, when the cleaning table is at the connection phase, the first coupler moves to the retraction position to disconnect the second coupler, and when the first coupler is at the retraction position, the cleaning table is rotatable about the second axis.

The cleaning apparatus is, for example, a deburring apparatus that causes the jet to collide with the burr to remove the burr.

The workpiece has one or more cleaning target portions. The cleaning target portion is, for example, a female screw, an oil hole, a water hole, a milling cut surface, a boss or an edge of a milling cut surface, an intersection of intersecting holes, and a place where a casting burr is generated.

The nozzle is, for example, a lance, a lateral jet splay nozzle, or a straight jet splay nozzle.

The first through hole may have a column portion disposed at a position closer to the workpiece than the enlarged diameter portion. The column portion of the first through hole has substantially the same cross section as the second through hole. The column portion of the first through hole may have a cross section larger than the cross section of the second through hole. Preferably, the cross section of the first through hole is circular. The cross section of the first through hole may be polygonal. The column portion is, for example, a cylindrical portion.

The second through hole has a cross section having a size of exposing substantially the entire installation surface of the workpiece. When the second axis is oriented vertically upward, the workpiece is placed above the cross section of the second through hole. Preferably, the cross section of the second through hole is circular. The cross section of the second through hole may be polygonal.

The working fluid is hydraulic oil or compressed air, preferably compressed air.

The clamp is, for example, a swing clamp, a toggle clamp, or an inner diameter clamp.

The first through hole may have a larger cross section as the first through hole is farther from the installation surface of the workpiece. The first through hole may have a portion having a constant cross-sectional shape with respect to the depth on the installation surface side of the workpiece. Preferably, the cross section of the through hole is circular. For example, the first through hole has a cylindrical portion on the installation surface side of the workpiece, and has an enlarged diameter portion on the side opposite to the installation surface.

Preferably, the second through hole has a cross-sectional shape substantially the same as the minimum cross-sectional shape of the first through hole. Preferably, the side surface of the second through hole is continuous to the side surface of the first through hole. For example, the second through hole has the same cross section as the cylindrical portion of the first through hole. When the cross sections of the first through hole and the second through hole are circular, the axes of the first through hole and the second through hole are coaxial with the second axis, respectively.

The first coupler and the second coupler are arranged in pairs. One or more sets of first couplers and second couplers are disposed. The first coupler abuts the second coupler at the connection position to be connected to the second coupler. The first coupler separated from the second coupler is disconnected from the second coupler.

Preferably, the advancing and retracting direction extends in a direction perpendicular to the second axis. The second coupler may be disposed in the second connection block. The guide rod slides in the guide hole to reciprocate. The guide rod and the guide hole extend in the advancing and retracting direction. Preferably, a plurality of guide rods or guide holes are arranged. The connection block is guided by the guide rod or the guide hole to move.

The second coupler may be configured not to keep pressure. In this case, the clamp is of a single-acting type. When the working fluid is supplied to the clamp, the clamp unclamps the workpiece from the cleaning table. When the working fluid is no longer supplied to the clamp, the clamp clamps the workpiece to the cleaning table. When the first coupler is moved to the retracted position, the supply of the working fluid to the clamp is stopped and the clamp clamps the workpiece to the cleaning table. When the first coupler is moved to the connection position, the working fluid is supplied to the clamp. At this time, the clamp unclamps the workpiece from the cleaning table.

The second coupler may be configured to keep pressure. In this case, two sets of the first coupler and the second coupler are arranged. The clamp is also double acting type. For example, the clamp has a double acting cylinder. The cylinder is a double acting cylinder having two connection ports. Two connection ports are respectively connected to the second coupler.

The second coupler capable of keeping pressure may be combined with a working fluid that is hydraulic fluid.

According to the cleaning apparatus and the rotary table of the present invention, the cleaning target portion of any surface of the workpiece can be cleaned by a downward nozzle or a lance.

DETAILED DESCRIPTION

First Embodiment

Figure 1:
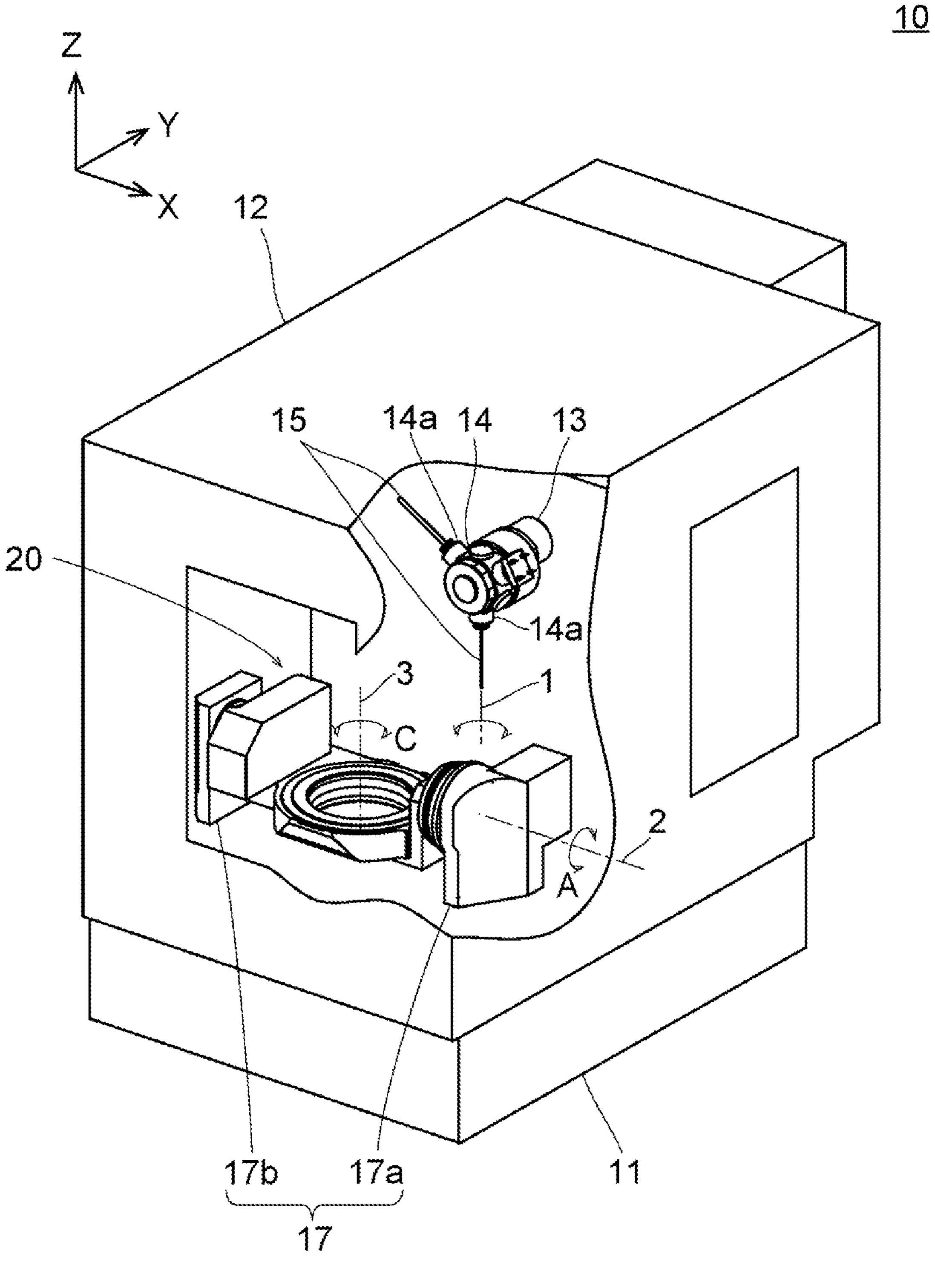
FIG. 1 is a perspective view of a cleaning apparatus according to a first embodiment.

As shown in FIG. 1, a cleaning apparatus 10 according to the present embodiment includes a frame 11, a cleaning chamber 12, a moving device 13, a turret (nozzle table) 14, a plurality of nozzles 15, a table rotating device 17, a rotary table 20, and a jig 40.

The cleaning chamber 12, the moving device 13, and the table rotating device 17 are fixed to the frame 11. The cleaning chamber 12 is a box-shaped cover that covers an upper portion of the frame 11. The cleaning chamber 12 has a loading door. The moving device 13 moves the turret 14 in a left-right direction (X-axis), in a front-rear direction (Y-axis), and in an up-down direction (Z-axis). The moving device 13, which is, for example, a column traverse type moving device, has a feed table.

The table rotating device 17 rotates the rotary table 20. The rotary table 20 rotates in a rotation direction (about A-axis) having a center at a first axis 2 extending in the left-right direction. The table rotating device 17 includes a driving device 17*a* and a tailstock 17*b*. The table rotating device 17 is disclosed, for example, in Japanese Patent No. 6752346.

The turret 14 is installed on the moving device 13. The turret 14 is disposed inside the cleaning chamber 12. The turret 14 includes a plurality of spindle support bases 14*a* and a plurality of spindles 14*b*. The spindle 14*b* is rotatably supported by the spindle support base 14*a*.

The nozzle 15 is fastened to the spindle 14*b*. The nozzle 15 rotates integrally with the spindle 14*b*. The turret 14 rotates a single nozzle 15 directing downward about a nozzle rotational axis 1 extending in the up-down direction.

Instead of the turret 14 and the plurality of nozzles 15, a nozzle base and a single nozzle 15 may be arranged. In this case, the moving device 13 moves the nozzle 15 in the left-right direction (X-axis), the front-rear direction (Y-axis), and the up-down direction (Z-axis).

The nozzle 15 is, for example, a lance 151 or a straight jet splay nozzle 152.

Figure 2:
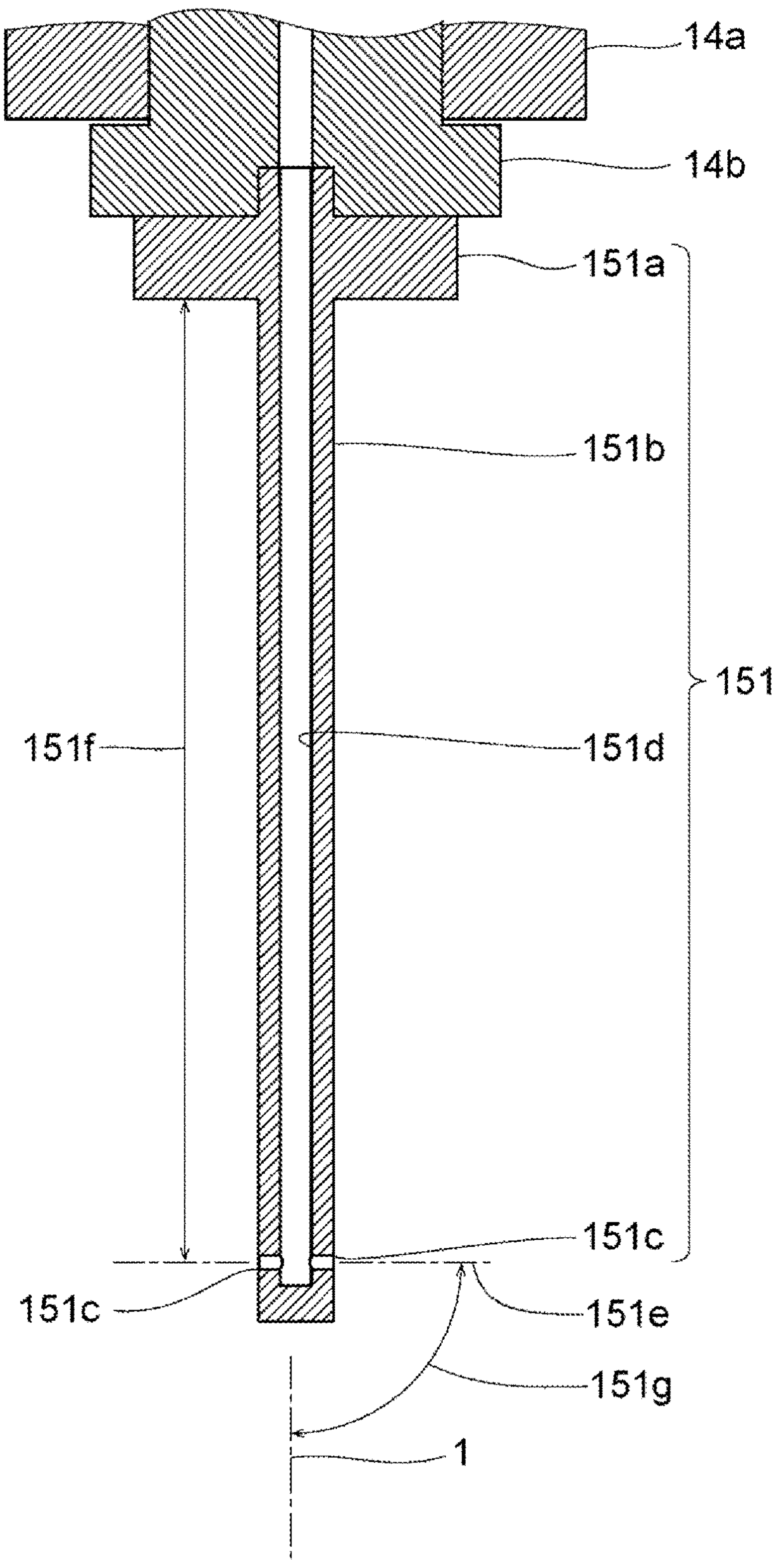
FIG. 2 is a longitudinal sectional view of a lance according to the first embodiment.

FIG. 2 is a longitudinal sectional view of the lance 151. As shown in FIG. 2, the lance 151 includes a flange 151*a*, a nozzle shaft 151*b*, an ejection port 151*c*, and a flow path 151*d*. The flange 151*a* is fastened to the spindle 14*b*. The nozzle shaft 151*b* is a right cylinder having a center extending along the nozzle rotational axis 1. The nozzle shaft 151*b* is directly connected to the flange 151*a*. The nozzle shaft 151*b* has a length 151*f* from a lower surface of the flange 151*a* to the ejection port 151*c*. The length 151*f* is longer than a length 20*f* of the rotary table 20 (see FIG. 5). Preferably, the length 151*f* is longer than a sum of the length 20*f* and a depth 5*f* of a cleaning target portion 5*c* to be inserted (see FIG. 5).

The ejection port 151*c* is disposed at a distal end portion of the nozzle shaft 151*b*. For example, two ejection ports 151*c* are arranged on a side surface of the nozzle shaft 151*b* so as to be rotationally symmetrical about the nozzle rotational axis 1. The ejection port 151*c* ejects the cleaning liquid along a jet axis 151*e*. A jet axis angle 151*g* between the jet axis 151*e* and the nozzle rotational axis 1 is, for example, 30 degrees to 90 degrees.

The flow path 151*d* extends along the center of the nozzle shaft 151*b*. The flow path 151*d* connects the flange 151*a* and the ejection port 151*c*. The nozzle 15 rotates about the nozzle rotational axis 1 integrally with the spindle 14*b*.

Figure 3:
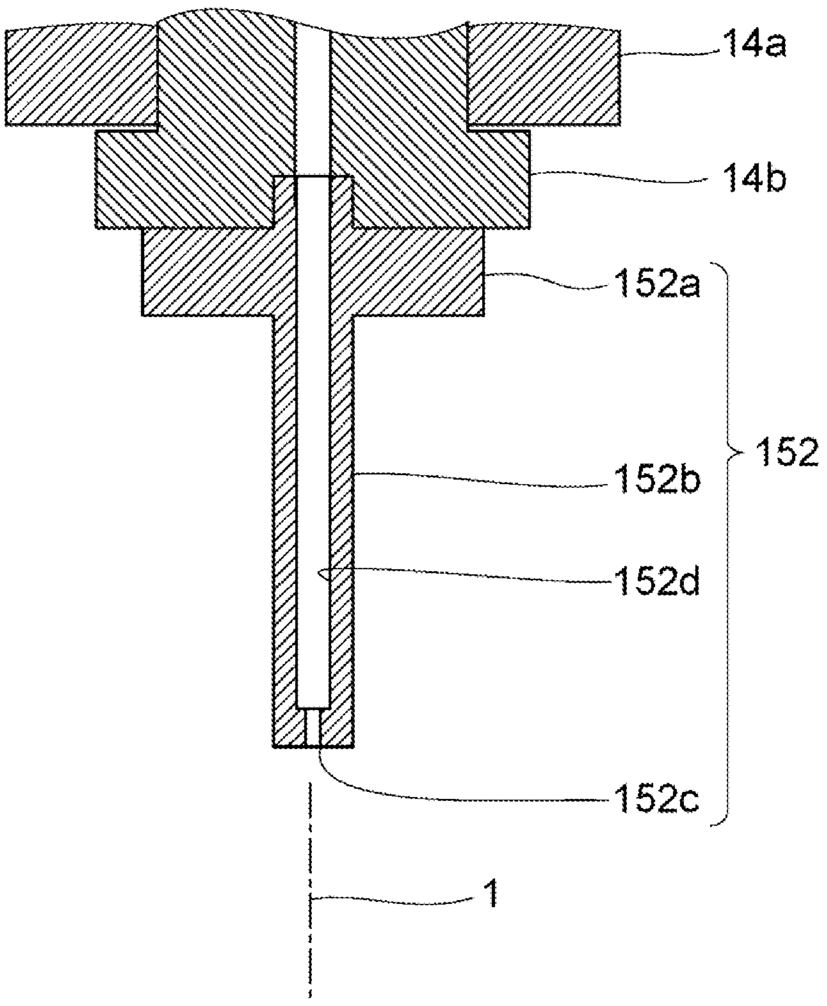
FIG. 3 is a longitudinal sectional view of a straight jet spray nozzle according to the first embodiment.

FIG. 3 is a longitudinal sectional view of the straight jet splay nozzle 152. As shown in FIG. 3, the straight jet splay nozzle 152 includes a flange 152*a*, a nozzle shaft 152*b*, an ejection port 152*c*, and a flow path 152*d*. The ejection port 152*c* is disposed on a distal end face of the nozzle shaft 152*b*. The ejection port 152*c* ejects a jet of the cleaning liquid having a linear rod shape along the nozzle rotational axis 1.

Next, the rotary table 20 will be described with reference to FIGS. 4 to 6. The rotary table 20 includes a support table 21, a bearing 25, a cleaning table 27, a toothed driven pulley 31, a toothed driving pulley 33, an endless toothed belt 35, a motor 37, a jig plate 38, a seat pin 41, a positioning pin 42, and a clamp 39. Preferably, the rotary table 20 includes a sealing 28, a sealing 30, and a motor cover 26. The rotary table 20 may include an idler 34 and a tensioner 36.

Figure 4:
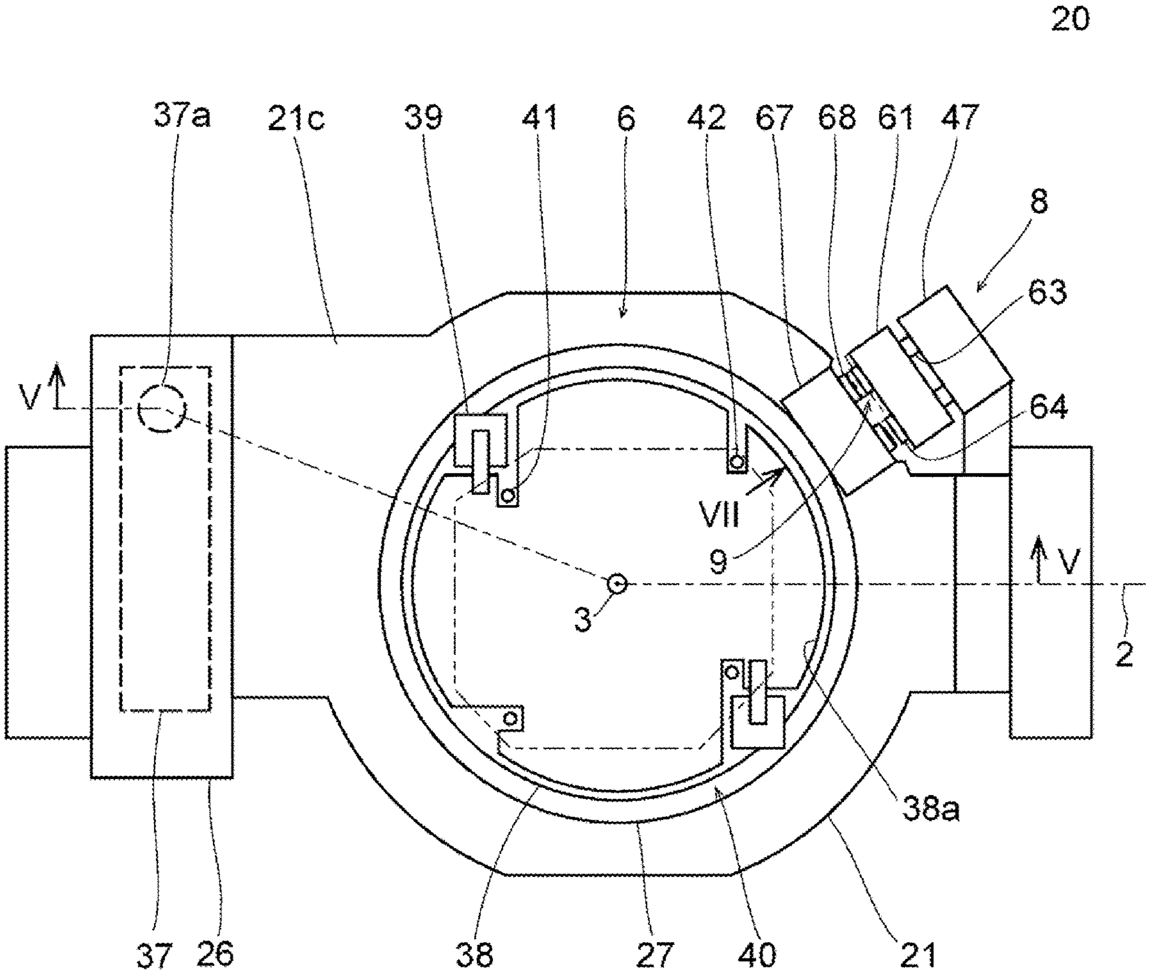
FIG. 4 shows a plan view of a rotary table according to the first embodiment.
Figure 5:
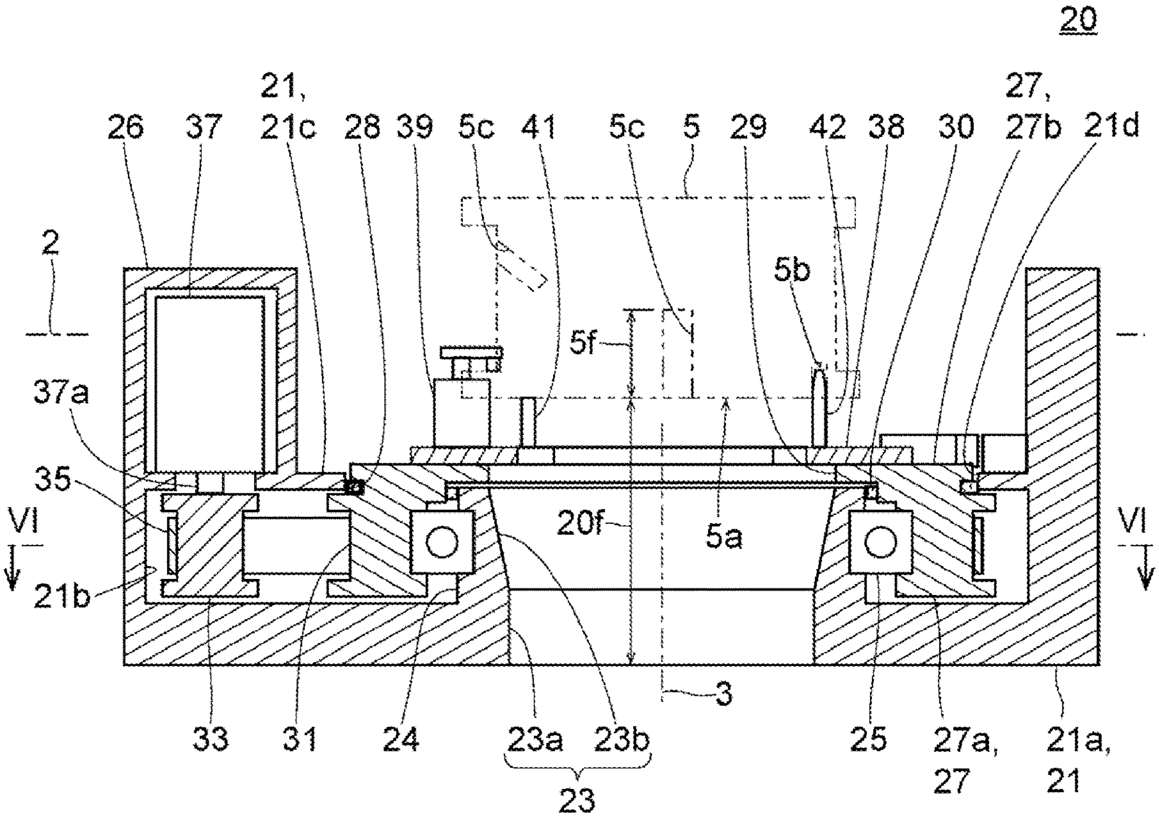
FIG. 5 is a cross-sectional view taken along line V-V in FIG. 4.

FIG. 4 shows a plan view showing the cleaning table 27 at a connection phase 6. A first connection block 61 and the first coupler 64 located at a retracted position 8 are depicted by solid lines. The first connection block 61 and the first coupler 64 located at a connection position 9 are depicted by two-dot chain lines.

A cross section V is a combined plane passing through an output shaft 37*a* of the motor 37, the second axis 3, and the first axis 2. The cross-section VI is a plane perpendicular to the second axis 3 and passing through a piston rod 51*b* (see FIG. 8). Hereinafter, for the sake of convenience, a description will be given on the assumption that the second axis 3 extends in the vertical direction and the workpiece 5 is installed above the rotary table 20.

The workpiece 5 is installed in the jig 40. As shown in FIG. 5, the workpiece 5 includes an installation surface 5*a*, a pin hole 5*b*, and a cleaning target portion 5*c*. The pin hole 5*b* is arranged on the installation surface 5*a*. The cleaning target portion 5*c* is a cleaning target portion into which the lance 151 is inserted. For convenience, a depth of the cleaning target portion 5*c* disposed on the installation surface 5*a* is defined as an insertion depth 5*f*.

The support table 21 is a trunnion table. The support table 21 is C-shaped as a whole. Both ends of the support table 21 are supported by the driving device 17*a* and the tailstock 17*b*. The support table 21 has a first surface and a second surface. The first surface is a surface on which the workpiece 5 is placed. In FIG. 5, the first surface is located above. The second surface is a surface opposite to the first surface. In FIG. 5, the second surface is located below.

The support table 21 includes a fixed shaft 24, a baseplate 21*a*, a belt chamber 21*b*, and a first top plate 21*c*. The baseplate 21*a* has a C-shaped cross section. The fixed shaft 24 extends from the baseplate 21*a* toward the first axis 2 having a center at the second axis 3. A first through hole 23 is located inside the fixed shaft 24. The first through hole 23 may have a cylindrical portion 23*a* and an enlarged diameter portion 23*b*. The cylindrical portion 23*a* is disposed on the back surface side (lower side in FIG. 5) of the enlarged diameter portion 23*b*. The enlarged diameter portion 23*b* has an upwardly increasing cross section. The enlarged diameter portion 23*b* may be a right conical surface or may have a gently curved longitudinal section.

The bearing 25 is mounted on an outer side of the fixed shaft 24. The belt chamber 21*b* extends from the periphery of the fixed shaft 24 toward the motor 37 in a plan view on the upper surface (upper side in FIG. 5) of the baseplate 21*a* (see FIG. 6). The first top plate 21*c* is disposed above the belt chamber 21*b* and extends over substantially the entire surface of the support table 21 (see FIG. 4). The first top plate 21*c* has an opening 21*d*. The opening 21*d* is circular having a center at the second axis 3, and larger than the outer diameter of the bearing 25. The first top plate 21*c* may be detachable from the support table 21.

The cleaning table 27 rotates in a rotation direction (about C-axis) having a center at the second axis 3 perpendicular to the first axis 2. The cleaning table 27 includes a hollow rotation shaft 27*a*, a second top plate 27*b*, and a second through hole 29. The hollow rotation shaft 27*a*, which is mounted on an outer side of the bearing 25, is disposed inside the belt chamber 21*b*. The second top plate 27*b* is located slightly above an upper end of the fixed shaft 24. An outer peripheral portion of the second top plate 27*b* is connected to the hollow rotation shaft 27*a*. The second top plate 27*b* may be integral with the hollow rotation shaft 27*a*. The outer periphery of the second top plate 27*b* is circular. Preferably, the outer diameter of the second top plate 27*b* is slightly smaller than the opening 21*d* of the first top plate 21*c*. The second through hole 29 has a circular cross-section having a center at the second axis 3. The second through hole 29 is located in the second top plate 27*b*. For example, the inner diameter of the second through hole 29 is the same as the diameter of the upper end of the enlarged diameter portion 23*b* of the first through hole 23.

The sealing 28 seals between the first top plate 21*c* and the second top plate 27*b*. The sealing 30 seals between the fixed shaft 24 and the hollow rotation shaft 27*a*.

The motor 37 is installed on the support table 21. The motor 37 is disposed at an end portion of the support table 21 in a plan view. The motor 37 has an output shaft 37*a* that is parallel to the second axis 3. For example, the motor 37 is fastened to the first top plate 21*c* and covered with the motor cover 26. The motor 37 is, for example, a servo motor, a PM synchronous motor, or a stepping motor. The motor 37 may include a speed reducer.

The toothed driven pulley 31 is arranged radially outward of the hollow rotation shaft 27*a* to be fastened to the hollow rotation shaft 27*a*. The toothed driving pulley 33 is fastened to the output shaft 37*a*. The endless toothed belt 35 is mounted between the toothed driving pulley 33 and the toothed driven pulley 31. The idler 34 is installed on the support table 21 via, for example, the tensioner 36. The idler 34 is disposed outside the endless toothed belt 35. The tensioner 36 presses idler 34 against the endless toothed belt 35. This provides sufficient tension to the endless toothed belt 35.

The tensioner 36 may move the position of the motor 37.

The jig 40 includes a jig plate 38, a seat pin 41, a positioning pin 42, and the clamp 39.

Figure 8:
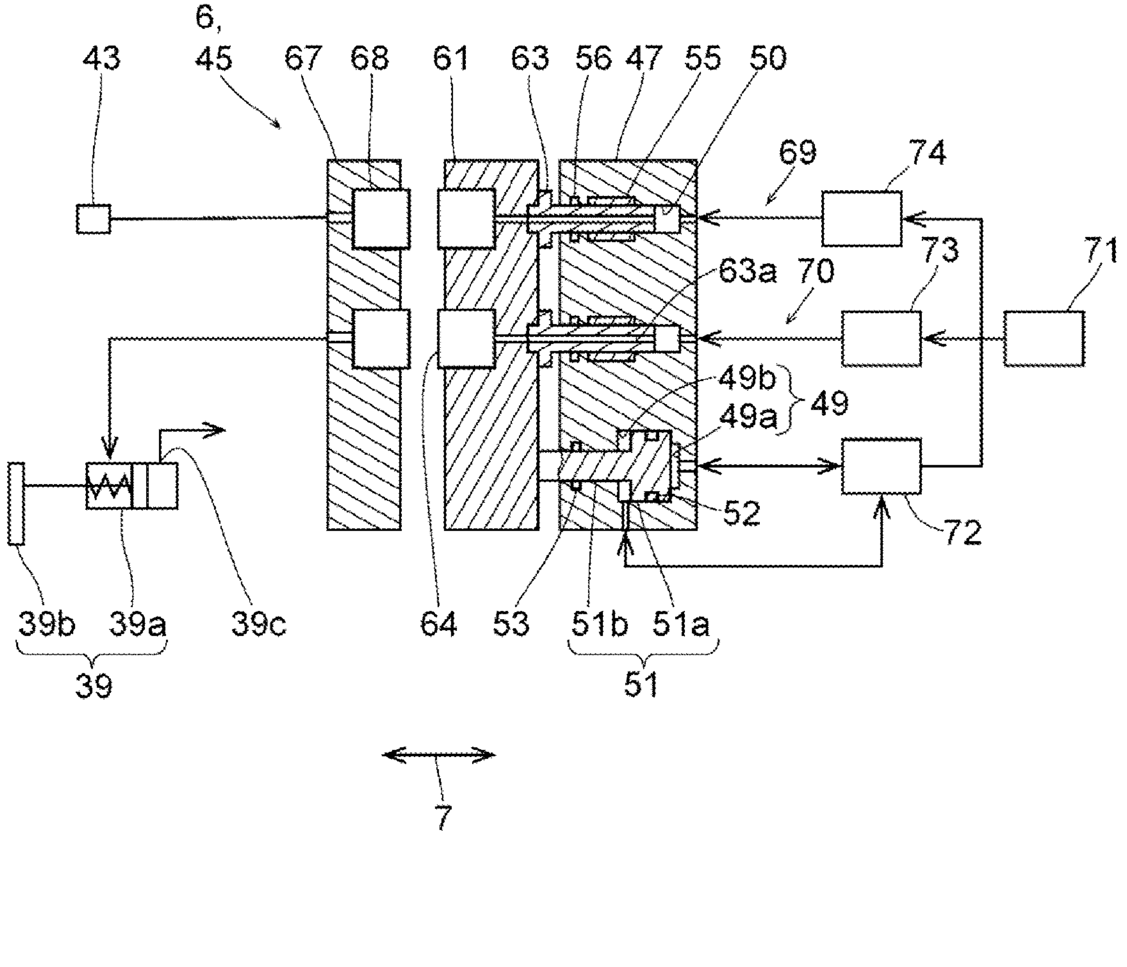
FIG. 8 is a cross-sectional view taken along line VIII-VIII in FIG. 7.

The jig 40 may include a seating detection nozzle 43 (see FIG. 8). The seating detection nozzle 43 may be disposed on the seat pin 41. When the workpiece 5 is installed on the seat pin 41, the seating detection nozzle 43 is substantially in close contact with the installation surface 5*a*.

The jig plate 38 is fastened to the second top plate 27*b*. The jig plate 38 has an opening 38*a*. As shown in FIG. 4, the opening 38*a* exposes substantially the entire surface of the installation surface 5*a* of the workpiece 5 to the first through hole 23.

The seat pin 41 extends upward from the jig plate 38. The installation surface 5*a* of the workpiece 5 is placed on the seat pin 41.

The positioning pin 42 extends upwardly from the jig plate 38. The positioning pin 42 is inserted into the pin hole 5*b* of the workpiece 5.

The clamp 39 is a single acting clamp. The clamp 39 is installed on the jig plate 38. The clamp 39 may include a single acting cylinder 39*a*, a clamp arm 39*b*, and an inlet-outlet port 39*c*. The clamp 39 may be, for example, a swing clamp or a toggle clamp. The clamp 39 clamps the workpiece 5 in a normal state. The clamp 39 unclamps the workpiece 5 only when the working fluid is supplied to the single acting cylinder 39*a*.

Figure 6:
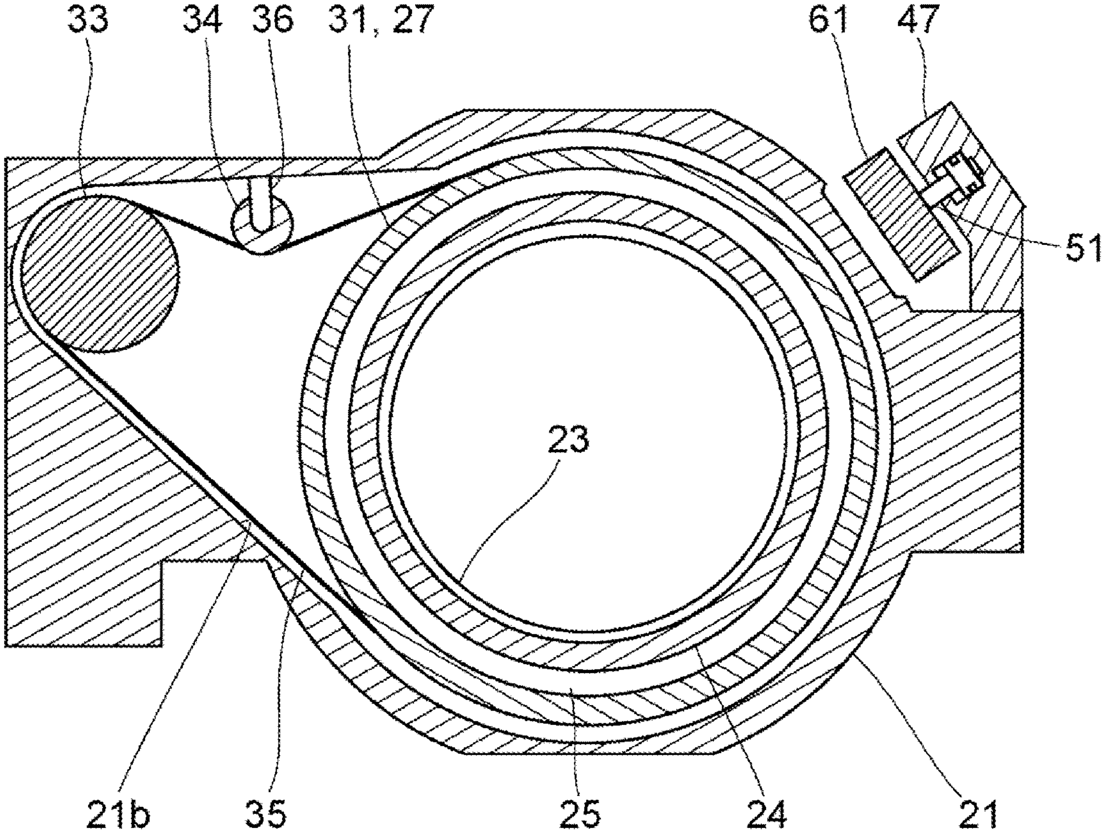
FIG. 6 is a cross-sectional view taken along line VI-VI in FIG. 5.
Figure 7:
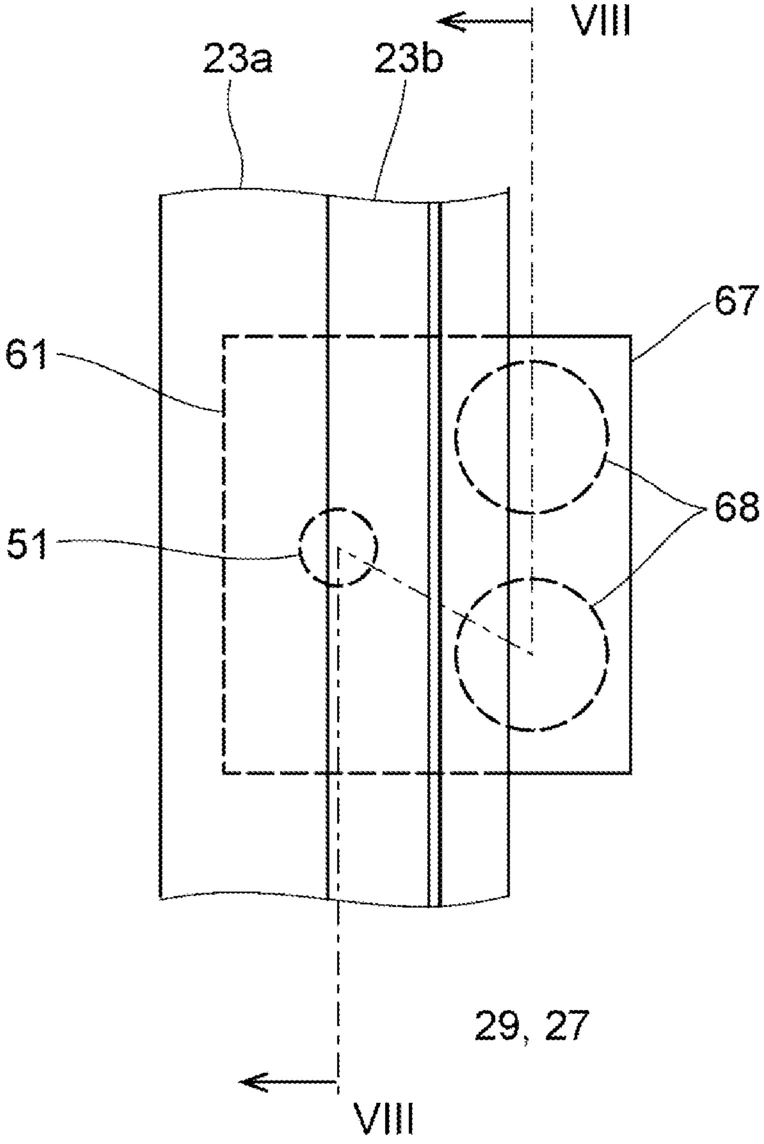
FIG. 7 shows a view taken along arrow VII in FIG. 4.

As shown in FIGS. 6 and 8, a coupling device 45 includes a body 47, a first connection block 61, a piston body 51, a guide rod 63, a plurality (two in FIG. 8) of first couplers 64, a second connection block 67, and a plurality (two in FIG. 8) of second couplers 68. The coupling device 45 may include a guide bush 55, a guide seal 56, a rod seal 53, and a piston seal 52. Here, for convenience, in FIG. 8, the coupling device 45 extends in the lateral direction.

In FIG. 8, a circuit connected to the seating detection nozzle 43 is referred to as a first circuit 69. A circuit connected to the clamp 39 is referred to as a second circuit 70. When the cleaning table 27 is at the connection phase 6, the body 47, the first connection block 61, and the second connection block 67 are aligned along the advancing and retracting direction 7. The advancing and retracting direction 7 extends in a direction perpendicular to the second axis 3. The advancing and retracting direction 7 is a direction in which the piston body 51 expands and contracts.

The body 47 is fastened to the support table 21. The body 47 has a cylinder 49 and a guide hole 50. The body 47 has, for example, a rectangular parallelepiped shape. The body 47 is disposed along a plane perpendicular to the advancing and retracting direction 7. The cylinder 49 is disposed, for example, at a lower central portion of the body 47 and extends along the advancing and retracting direction 7.

The piston body 51 is disposed inside the cylinder 49. The piston body 51 reciprocates inside the cylinder 49 in the advancing and retracting direction 7. The piston body 51 has a piston 51*a* and a piston rod 51*b*. The piston rod 51*b* is connected to the first connection block 61. The cylinder 49 is divided into a first chamber 49*a* and a second chamber 49*b* by the piston 51*a*. The piston seal 52, which is mounted to the piston 51*a*, seals between the first chamber 49*a* and the second chamber 49*b*.

The guide hole 50 is a cylindrical hole that opens toward the second axis 3 and extends along the advancing and retracting direction 7. The guide bush 55 or the guide seal 56 may be disposed in the guide hole 50.

The first connection block 61 is disposed closer to the second axis 3 than the body 47. The first connection block 61 is, for example, a rectangular parallelepiped. The first connection block 61 is disposed along a plane perpendicular to the advancing and retracting direction 7.

The guide rod 63 is fastened to the first connection block 61. The guide rod 63, which has a cylindrical shape, extends along the advancing and retracting direction 7. The guide rod 63 has a fluid channel 63*a* therein. The fluid channel 63*a* connects the guide hole 50 and the first coupler 64. The guide rod 63 has, for example, a flange or a fitting portion to be arranged at an accurate position with respect to the first connection block 61. The guide rod 63 slides in the guide hole 50. The guide rod 63 may slide on the guide bush 55.

The guide seal 56 is attached to the guide hole 50 to seal between the guide rod 63 and the guide hole 50. Preferably, a gap is provided between a distal end of the guide rod 63 and a bottom of the guide hole 50 when the first connection block 61 is at the retracted position 8. Preferably, when the first connection block 61 is at the connection position 9, the guide rod 63 is inserted into the guide hole 50 with a sufficient length.

The first coupler 64 is disposed on the second axis 3 side of the first connection block 61. Preferably, the first couplers 64 are arranged side by side on a plane perpendicular to the advancing and retracting direction 7.

The first connection block 61, which is guided by the guide hole 50 and the guide rod 63, reciprocates along the advancing and retracting direction 7 by the piston body 51. The first coupler 64, the first connection block 61, the piston body 51, and the guide rod 63 reciprocate together.

The second connection block 67 is fastened to the cleaning table 27. The second connection block 67 has, for example, a rectangular parallelepiped shape. When the cleaning table 27 is at the connection phase 6, the second connection block 67 is arranged along a plane perpendicular to the advancing and retracting direction 7. The first coupler 64 and the second coupler 68 are arranged in parallel and coaxially to face each other.

The second coupler 68 is disposed on the first connection block 61 side of the second connection block 67. Preferably, when the cleaning table 27 is at the connection phase 6, the second couplers 68 are arranged side by side on a plane perpendicular to the advancing and retracting direction 7. The second coupler 68 is brought into contact with the first coupler 64 to be connected to the first coupler 64. The second coupler 68 is connected to the seating detection nozzle 43 and the clamp 39. The second coupler 68 rotates about the second axis 3 integrally with the second connection block 67 and the cleaning table 27.

As shown in FIG. 8, the cleaning apparatus 10 includes a working fluid source 71, a piston valve 72, a clamp valve 73, and a seating detection device 74.

The working fluid source 71 is, for example, a compressor or a factory air supply port. The working fluid is compressed air.

The piston valve 72 is a direction switching valve. Preferably, the piston valve 72 is a solenoid valve. The piston valve 72 is, for example, a four-port valve. The piston valve 72 supplies the working fluid to either one of the first chamber 49*a* or the second chamber 49*b*, and discharges the working fluid from the other one.

When the cleaning table 27 is at the connection phase 6, the piston valve 72 supplies compressed air to the first chamber 49*a* and vents air from the second chamber 49*b*. Then, the piston 51*a* moves to the left side in FIG. 8, and the first connection block 61 moves to the connection position 9. At this time, the two sets of the first couplers 64 and two sets of the second couplers 68 are in contact to be connected to each other. Here, the first connection block 61 is guided by the guide rod 63 and the guide hole 50 to move in parallel. Thus, the two sets of the first couplers 64 and the two sets of the second couplers 68 can be accurately abutted to be connected.

The piston valve 72 supplies compressed air to the second chamber 49*b* and vents air from the first chamber 49*a*. Then, the piston 51*a* moves to the right side in FIG. 8, and the first connection block 61 moves to the retracted position 8. At this time, the first coupler 64 and the second coupler 68 are separated from each other. When the cleaning table 27 rotates, the first coupler 64 and the first connection block 61 do not interfere with the second connection block 67 or the second coupler 68.

The clamp valve 73 is a two-port valve. Preferably, the clamp valve 73 is a solenoid valve. The clamp valve 73 supplies the working fluid to the clamp 39 via the second circuit 70 when the first coupler 64 and the second coupler 68 are connected. When the first coupler 64 and the second coupler 68 are disconnected, the clamp valve 73 shuts off the working fluid.

The seating detection device 74 is disposed between the guide hole 50 and the working fluid source 71. When the first coupler 64 and the second coupler 68 are connected, the first circuit 69 connects the seating detection nozzle 43 and the working fluid source 71 via the seating detection device 74. At this time, the seating detection device 74 causes the working fluid to flow to the seating detection nozzle 43 at a constant pressure.

When the workpiece 5 is appropriately installed, the installation surface 5*a* of the workpiece 5 closes the seating detection nozzle 43 to increase the fluid pressure in the first circuit 69. At this time, the seating detection device 74 detects the installation of the workpiece 5. When the workpiece 5 is not appropriately installed, the installation surface 5*a* does not close the seating detection nozzle 43. At this time, the fluid pressure in the first circuit 69 decreases, and the seating detection device 74 does not detect the installation of the workpiece 5.

According to the present embodiment, the rotary table 20 freely rotates the workpiece 5 in the A-axis direction and C-axis direction. Any cleaning target portion 5*c* of the workpiece 5 is thus directed vertically upward (Z-axis). The lance 151 and the straight jet splay nozzle 152 freely moves in XYZ direction. The lance 151 is thus inserted into the cleaning target portion 5*c* that opens in any direction. In addition, the axis line of the cleaning target portion 5*c* which opens in any direction can be aligned with the nozzle rotational axis 1. The jet ejected from the straight jet splay nozzle 152 thus straightly collides with the cleaning target portion 5*c*.

The support table 21 has the first through hole 23. The cleaning table 27 has the second through hole 29 that overlaps with the first through hole 23. The substantially entire surface of the installation surface 5*a* of the workpiece 5 is thus exposed to the back surface of the support table 21 through the first through hole 23, the second through hole 29 and the opening 38*a*. The length 151*f* of the lance 151 is longer than the sum of the length 20*f* of the rotary table 20 and the depth 5*f* of the cleaning target portion 5*c* (see FIG. 5). The lance 151 is thus inserted through the first through hole 23, the second through hole 29 and the opening 38*a* from the back surface of the support table 21 to the cleaning target portion 5*c* located on the installation surface 5*a*.

Further, the jet ejected from the straight jet splay nozzle 152 collides with the cleaning target portion 5*c* through the first through hole 23, the second through hole 29 and the opening 38*a*.

Figure 9:
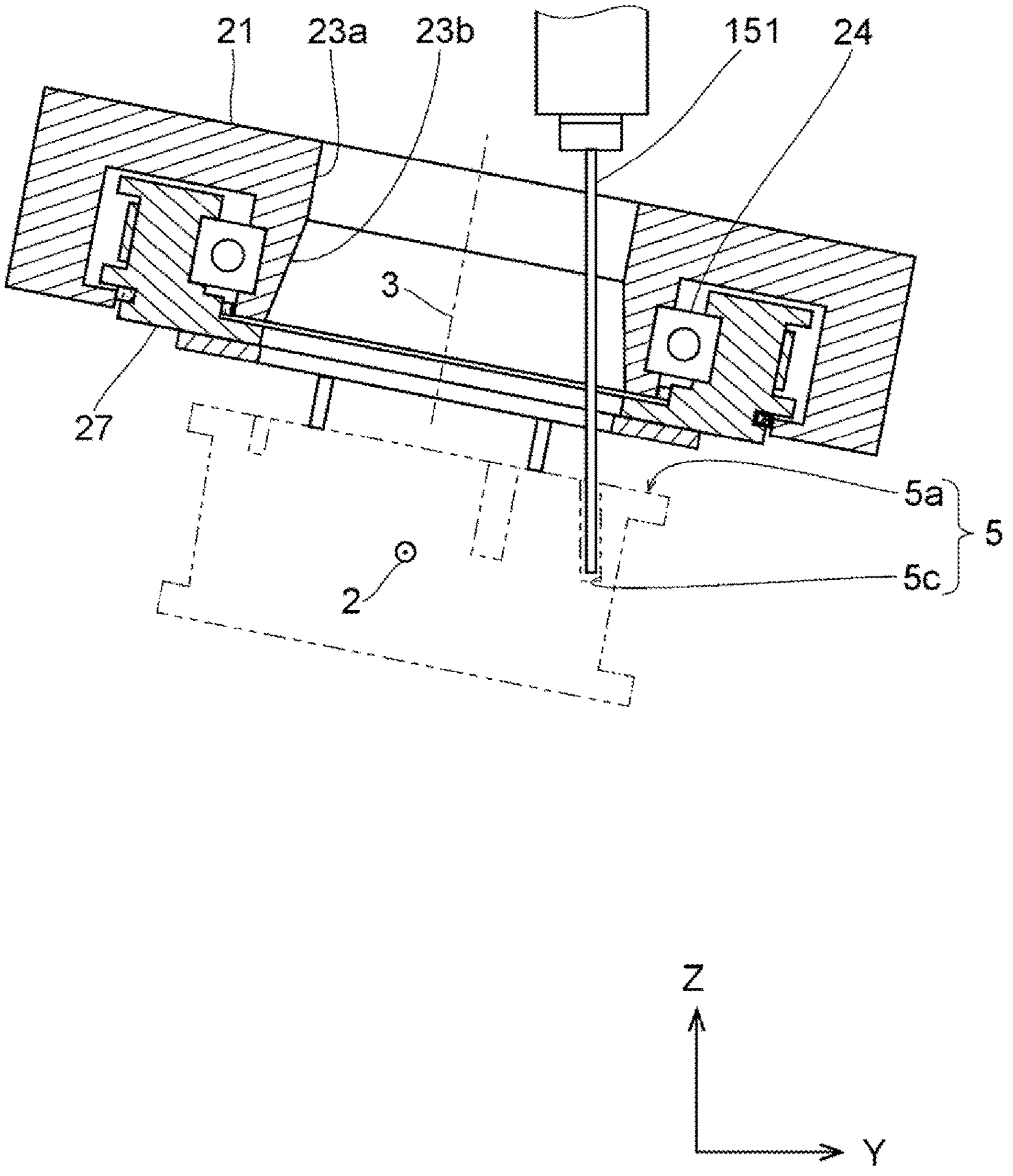
FIG. 9 is a cross-sectional view showing a cleaning state of a workpiece by the cleaning apparatus according to the first embodiment.

Preferably, the first through hole 23 and the second through hole 29 are sufficiently larger than the installation surface 5*a* of the workpiece 5. However, depending on the installation area of the cleaning apparatus 10 and the size of the cleaning chamber 12, the first through hole 23 and the second through hole 29 may not be sufficiently large. When the installation surface 5*a* is larger than the first through hole 23 and the second through hole 29, the installation surface 5*a* of the workpiece 5 may be partially hidden as viewed along the second axis 3. As the first through hole 23 has the enlarged diameter portion 23*b*, the lance 151 can be inserted into the peripheral portion of the installation surface 5*a* by tilting the second axis 3 with respect to the vertical direction as shown in FIG. 9. Similarly, the jet ejected from the straight jet splay nozzle 152 collides with the peripheral portion of the installation surface 5*a*.

As described above, the cleaning apparatus 10 according to the present embodiment cleans the workpiece 5 better.

Further, the cleaning apparatus 10 according to the present embodiment allows all the cleaning target portions 5*c* to be cleaned by the lance 151 or the straight jet splay nozzle 152. This allows any surfaces and the cleaning target portion 5*c* disposed on any surfaces to be cleaned without using the L-shaped ejection nozzle.

When the cleaning table 27 is at the connection phase 6, the coupling device 45 connects the first coupler 64 and the second coupler 68. At this time, the clamp valve 73 supplies the working fluid to the clamp 39, and the clamp 39 unclamps the workpiece 5. The robot or the operator removes the workpiece 5 on which the cleaning is completed, and then installs a workpiece 5 to be cleaned next. Here, the seating detection device 74 checks whether or not the workpiece 5 is appropriately installed. The coupling device 45 then moves the first coupler 64 to the retracted position 8. At this time, the clamp 39 clamps the workpiece 5, and the cleaning table 27 becomes rotatable. As the clamp 39 is a single acting clamp, the workpiece 5 can be clamped in a state in which the coupling device 45 is disconnected without holding the working fluid in the clamp 39.

Second Embodiment

Figure 10:
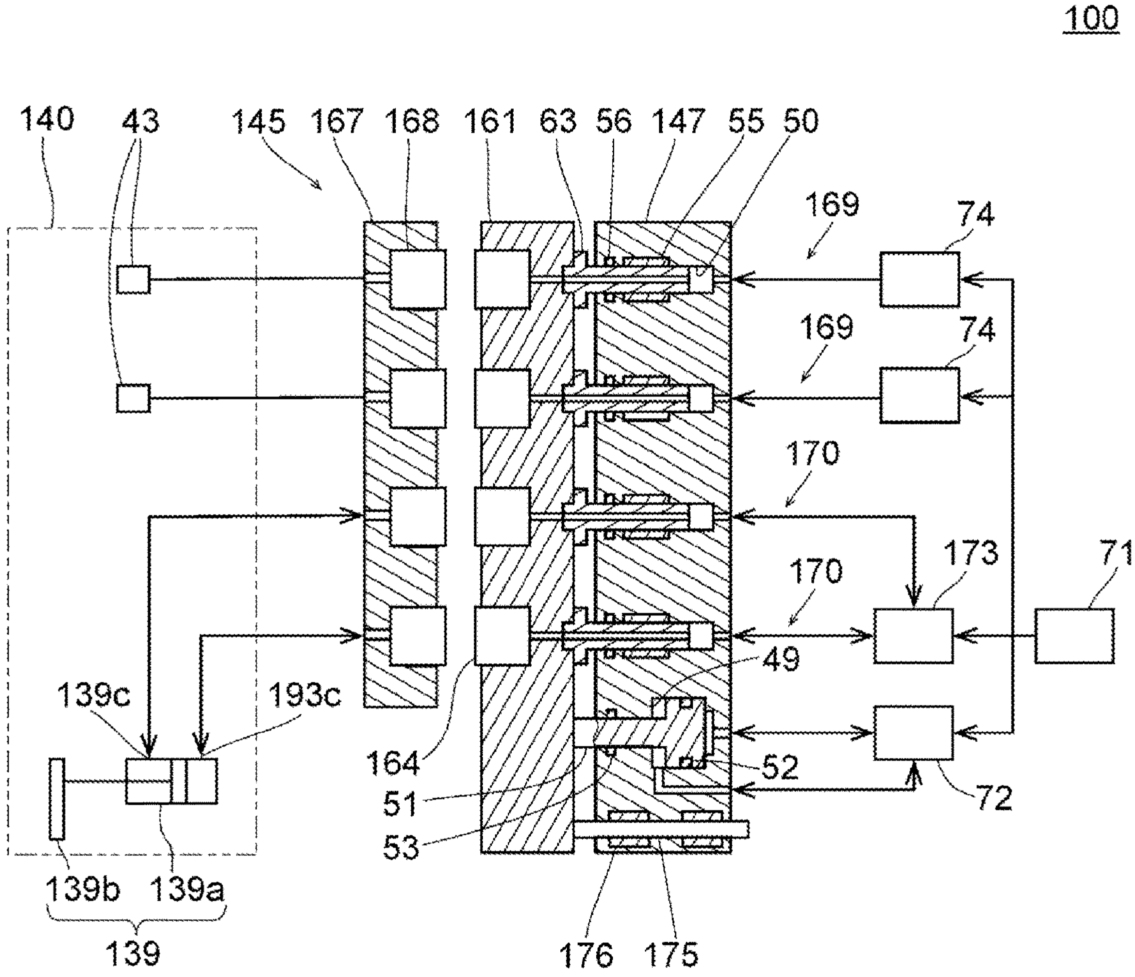
FIG. 10 is a cross-sectional view of a coupler according to a second embodiment.

As illustrated in FIG. 10, the cleaning apparatus 100 according to the present embodiment includes a coupling device 145, two seating detection nozzles 43, and a double acting clamp 139. The rest of the cleaning apparatus 100 is substantially identical to the cleaning apparatus 10 of the first embodiment.

The coupling device 145 includes a body 147, a first connection block 161, a second connection block 167, a first coupling 164, and a second coupling 168. The coupling device 145 may include a guide shaft 175 and a guide bush 176. The coupling device 145 includes two sets of first circuits 169 and two sets of second circuits 170. The configuration of the first circuit 169 is substantially the same as that of the first circuit 69 of the first embodiment. The configuration of the second circuit 170 is substantially the same as that of the second circuit 70 of the first embodiment.

The first coupling 164 is connected to the second coupling 168. The second coupling 168 keeps the internal pressure of the working fluid when separated from the first coupling 164.

The guide bush 176 is disposed on the body 147. The guide shaft 175 is fastened to the first connection block 161. The guide shaft 175 extends in the advancing and retracting direction 7. The guide shaft 175 slides inside the guide bush 176.

The first connection block 161 is guided by the guide rod 63 and the guide shaft 175 to reciprocate in the advancing and retracting direction 7. This allows the first connection block 161 to reciprocate smoothly while preventing the first connection block 161 from inclining.

The jig 140 includes a clamp 139 and two seating detection nozzles 43.

The clamp 139 is a double acting clamp. The clamp 139 includes a double acting cylinder 139*a* and a clamp arm 139*b*. The double acting cylinder 139*a* includes two ports 139*c*. The ports 139*c* are connected to each of the second circuit 170. The seating detection nozzles 43 are connected to each of the first circuit 169.

The clamp valve 173 is, for example, a 3-position 5-port solenoid valve. The clamp valve 173, for example, stops the clamp 139 at an intermediate position.

According to the cleaning apparatus 100 of the present embodiment, the internal pressure of the working fluid can be maintained when the second coupling 168 is separated from the first coupling 164, and thus the double acting clamp 139 can be used. In addition, when the clamp valve 173 is a three-position solenoid valve, the double acting clamp 139 can be stopped at an intermediate position. For example, the clamp valve 173 can immediately stop the clamp 139 when a robot or an operator's body enters the cleaning apparatus 100 during a clamping operation.

REFERENCE SIGNS LIST

2 First axis
3 Second axis
5 Workpiece
5*a* Installation surface
6 Connection phase
8 Retracted position
9 Connection position
14 Turret (Nozzle base)
15, 151, 152 Nozzle
21 Support table
23 First through hole
23*b* Diameter expansion portion
24 Fixed shaft
25 Bearing
27 Cleaning table
29 Second through hole
31 Toothed driven pulley
33 Toothed driving pulley
35 Endless toothed belt
37 Motor
37*a* Output shaft
39, 139 Clamp
47, 147 Body
49 Cylinder
50 Guide hole
61, 161 Connection block
63 Guide rod
63 Fluid channel
64, 164 First coupler
68, 168 Second coupler
71 Working fluid source
151*b*, 152*b* Shaft
151*c*, 152*c* Ejection port

What is claimed is:

1. A cleaning apparatus for cleaning a workpiece, comprising:

a support table configured to rotate about a first axis that extends horizontally, the support table having a first surface and a second surface on an opposite side of the support table, the support table having a first through hole that passes through the support table from the first surface to the second surface in a direction of a second axis that is perpendicular to the first axis and perpendicular to the first and second surfaces;

a cleaning table on which the workpiece is to be installed, the cleaning table being rotatably supported by the support table so as to be rotatable about the second axis, the cleaning table having a second through hole extending therethrough in a direction of the second axis, the second through hole being aligned with the first through hole along the second axis such that substantially the entirety of an installation surface of the workpiece will be exposed through the first and second through holes when the workpiece is mounted to the cleaning table;

a nozzle base configured to move in a lateral direction, a front-rear direction, and a vertical direction relative to the support table; and a nozzle disposed on the nozzle base in a rotatable manner about a nozzle rotational axis extending in the vertical direction.

2. The cleaning apparatus according to claim 1, wherein the nozzle includes a nozzle shaft extending along the nozzle rotational axis, and an ejection port located at a distal end portion of the nozzle shaft.

3. The cleaning apparatus according to claim 2, wherein the nozzle is a lance, and the nozzle shaft has a greater length than a length from the second surface to the installation surface.

4. The cleaning apparatus according to claim 2, wherein the first through hole has an enlarged diameter portion having a larger cross section toward the workpiece.

5. The cleaning apparatus according to claim 2, further comprising:

a motor disposed on the support table, the motor having an output shaft;

a toothed driving pully arranged on the output shaft;

a toothed driven pully arranged outside of the cleaning table;

an endless toothed belt mounted between the toothed driving pully and the toothed driven pully;

a fixed shaft disposed on the support table along the second axis, the fixed shaft having the first through hole; and a bearing disposed outside the fixed shaft;

wherein the cleaning table is supported outside the bearing.

6. The cleaning apparatus according to claim 2, further comprising:

a working fluid source;

a first coupler disposed on the support table to be connected to the working fluid source, the first coupler configured to advance or retract between a connection position and a retraction position, the first coupler being close to the second axis at the connection position, and the first coupler being away from the second axis at the retraction position;

a second coupler disposed on the cleaning table to be rotatable integrally with the cleaning table; and a clamp connected to the second coupler;

wherein, when the cleaning table is at a connection phase, the first coupler moves to the connection position to be connected to the second coupler for connecting the clamp to the working fluid source, when the cleaning table is at the connection phase, the first coupler moves to the retraction position to disconnect the second coupler, and when the first coupler is at the retraction position, the cleaning table is rotatable about the second axis.

7. The cleaning apparatus according to claim 1, wherein the nozzle is a lance, and the nozzle shaft has a greater length than a length from the second surface to the installation surface.

8. The cleaning apparatus according to claim 7, wherein the first through hole has an enlarged diameter portion having a larger cross section toward the workpiece.

9. The cleaning apparatus according to claim 7, further comprising:

a motor disposed on the support table, the motor having an output shaft;

a toothed driving pully arranged on the output shaft;

a toothed driven pully arranged outside of the cleaning table;

an endless toothed belt mounted between the toothed driving pully and the toothed driven pully;

a fixed shaft disposed on the support table along the second axis, the fixed shaft having the first through hole; and a bearing disposed outside the fixed shaft;

wherein the cleaning table is supported outside the bearing.

10. The cleaning apparatus according to claim 7, further comprising:

a working fluid source;

a first coupler disposed on the support table to be connected to the working fluid source, the first coupler configured to advance or retract between a connection position and a retraction position, the first coupler being close to the second axis at the connection position, and the first coupler being away from the second axis at the retraction position;

a second coupler disposed on the cleaning table to be rotatable integrally with the cleaning table; and a clamp connected to the second coupler;

wherein, when the cleaning table is at a connection phase, the first coupler moves to the connection position to be connected to the second coupler for connecting the clamp to the working fluid source, when the cleaning table is at the connection phase, the first coupler moves to the retraction position to disconnect the second coupler, and when the first coupler is at the retraction position, the cleaning table is rotatable about the second axis.

11. The cleaning apparatus according to claim 1, wherein the first through hole has an enlarged diameter portion having a larger cross section toward the workpiece.

12. The cleaning apparatus according to claim 11, further comprising:

a motor disposed on the support table, the motor having an output shaft;

a toothed driving pully arranged on the output shaft;

a toothed driven pully arranged outside of the cleaning table;

an endless toothed belt mounted between the toothed driving pully and the toothed driven pully;

a fixed shaft disposed on the support table along the second axis, the fixed shaft having the first through hole; and a bearing disposed outside the fixed shaft;

wherein the cleaning table is supported outside the bearing.

13. The cleaning apparatus according to claim 11, further comprising:

a working fluid source;

a first coupler disposed on the support table to be connected to the working fluid source, the first coupler configured to advance or retract between a connection position and a retraction position, the first coupler being close to the second axis at the connection position, and the first coupler being away from the second axis at the retraction position;

a second coupler disposed on the cleaning table to be rotatable integrally with the cleaning table; and a clamp connected to the second coupler;

wherein, when the cleaning table is at a connection phase, the first coupler moves to the connection position to be connected to the second coupler for connecting the clamp to the working fluid source, when the cleaning table is at the connection phase, the first coupler moves to the retraction position to disconnect the second coupler, and when the first coupler is at the retraction position, the cleaning table is rotatable about the second axis.

14. The cleaning apparatus according to claim 1, further comprising:

a motor disposed on the support table, the motor having an output shaft;

a toothed driving pully arranged on the output shaft;

a toothed driven pully arranged outside of the cleaning table;

an endless toothed belt mounted between the toothed driving pully and the toothed driven pully;

a fixed shaft disposed on the support table along the second axis, the fixed shaft having the first through hole; and a bearing disposed outside the fixed shaft;

wherein the cleaning table is supported outside the bearing.

15. The cleaning apparatus according to claim 14, further comprising:

a working fluid source;

a first coupler disposed on the support table to be connected to the working fluid source, the first coupler configured to advance or retract between a connection position and a retraction position, the first coupler being close to the second axis at the connection position, and the first coupler being away from the second axis at the retraction position;

a second coupler disposed on the cleaning table to be rotatable integrally with the cleaning table; and a clamp connected to the second coupler;

wherein, when the cleaning table is at a connection phase, the first coupler moves to the connection position to be connected to the second coupler for connecting the clamp to the working fluid source, when the cleaning table is at the connection phase, the first coupler moves to the retraction position to disconnect the second coupler, and when the first coupler is at the retraction position, the cleaning table is rotatable about the second axis.

16. A cleaning apparatus, comprising:

a support table configured to rotate about a first axis that extends horizontally, the support table having a first surface on which a workpiece is to be installed and a second surface opposed to the first surface, the support table having a first through hole that passes through the support table in a direction of a second axis that is perpendicular to the first axis;

a cleaning table on which the workpiece is to be installed, the cleaning table rotatable about the second axis, the cleaning table having a second through hole that passes through the cleaning table in a direction of the second axis to expose substantially entire surface of an installation surface of the workpiece;

a nozzle base configured to move in a lateral direction, a front-rear direction, and a vertical direction relative to the support table;

a nozzle disposed on the nozzle base in a rotatable manner about a nozzle rotational axis extending in the vertical direction;

a working fluid source;

a first coupler disposed on the support table to be connected to the working fluid source, the first coupler configured to advance or retract between a connection position and a retraction position, the first coupler being close to the second axis at the connection position, and the first coupler being away from the second axis at the retraction position;

a second coupler disposed on the cleaning table to be rotatable integrally with the cleaning table; and a clamp connected to the second coupler;

wherein, when the cleaning table is at a connection phase, the first coupler moves to the connection position to be connected to the second coupler for connecting the clamp to the working fluid source, when the cleaning table is at the connection phase, the first coupler moves to the retraction position to disconnect the second coupler, and when the first coupler is at the retraction position, the cleaning table is rotatable about the second axis.

17. The cleaning apparatus according to claim 16, further comprising:

a connection block on which the first coupler is disposed;

a body having a guide hole extending in an advancing and retracting direction of the first coupler, and a cylinder extending along the advancing and retracting direction;

a piston connected to the connection block to reciprocate inside the cylinder;

a guide rod disposed on the connection block, the guide rod having a fluid channel connecting the first coupler to the guide hole, the guide rod configured to advance or retrace inside the guide hole together with the piston and the connection block;

wherein the working fluid source is connected to the first coupler through the guide hole and the guide rod.

18. The cleaning apparatus according to claim 17, wherein the clamp includes a single acting cylinder.

19. The cleaning apparatus according to claim 16, wherein the clamp includes a single acting cylinder.

20. A rotary table, comprising:

a support table configured to rotate about a first axis that extends horizontally, the support table having a first through hole that passes through the support table in a direction of a second axis that is perpendicular to the first axis;

a cleaning table on which a workpiece is to be installed, the cleaning table rotatable about the second axis, the cleaning table having a second through hole that passes through the cleaning table in a direction of the second axis to expose substantially entire surface of an installation surface of the workpiece;

a working fluid source;

a first coupler disposed on the support table to be connected to the working fluid source, the first coupler configured to advance or retract between a connection position and a retraction position, the first coupler being close to the second axis at the connection position, and the first coupler being away from the second axis at the retraction position;

a second coupler disposed on the cleaning table to be rotatable integrally with the cleaning table; and a clamp connected to the second coupler;

wherein when the cleaning table is at a connection phase, the first coupler moves to the connection position to be connected to the second coupler for connecting the clamp to the working fluid source, when the cleaning table is at the connection phase, the first coupler moves to the retraction position to disconnect the second coupler, and when the first coupler is at the retraction position, the cleaning table is rotatable about the second axis.

* * * * *